United States Patent [19]

Havstad

[11] Patent Number: 4,633,856

[45] Date of Patent: Jan. 6, 1987

[54] PERCUSSOR SUBASSEMBLY FOR GENERATING GAS BURSTS

[75] Inventor: Harold R. Havstad, Eagle Point, Oreg.

[73] Assignee: Hudson Oxygen Therapy Sales Company, Temecula, Calif.

[21] Appl. No.: 793,201

[22] Filed: Oct. 31, 1985

Related U.S. Application Data

[60] Division of Ser. No. 602,146, Apr. 19, 1984, Pat. No. 4,566,441, which is a continuation-in-part of Ser. No. 223,355, Jan. 8, 1981, Pat. No. 4,445,503, which is a continuation-in-part of Ser. No. 50,685, Jun. 21, 1979, abandoned.

[51] Int. Cl.4 .................... A61H 23/04; F16K 3/316; F16K 3/00

[52] U.S. Cl. .................................... 128/40; 251/340; 128/55

[58] Field of Search .................... 231/340; 128/40, 54, 128/55, 64

[56] References Cited

U.S. PATENT DOCUMENTS

| | | | |
|---|---|---|---|
| 1,599,628 | 9/1926 | Davis | 128/40 |
| 2,052,098 | 8/1936 | Cockett | 128/40 |
| 2,657,709 | 11/1953 | Gillerstrom et al. | 251/340 |
| 2,693,338 | 11/1954 | Grunt | 251/340 |
| 2,971,742 | 2/1961 | Fausek et al. | 251/340 |
| 3,163,161 | 12/1964 | Courton | 128/40 |
| 4,387,708 | 6/1983 | Davis | 128/40 |
| 4,398,531 | 8/1983 | Havstad | 128/55 |
| 4,445,503 | 5/1984 | Havstad | 128/55 |

FOREIGN PATENT DOCUMENTS

| | | | |
|---|---|---|---|
| 0732509 | 5/1980 | U.S.S.R. | 251/340 |

*Primary Examiner*—Edgar S. Burr
*Assistant Examiner*—Tonya Eckstine
*Attorney, Agent, or Firm*—Seiler, Quirk & Tratos

[57] ABSTRACT

An improved percussor assembly comprises a rigid body member having gas inlet and gas outlet means, the latter including a restricted passageway and an enlarged passageway, and a vent passageway communicating with the enlarged portion adjacent the junction of the restricted passageway whereby atmospheric air is entrained into the enlarged passageway as gas flows therein from the restricted passageway thereby increasing the volume of gas supplied to a remote applicator while economizing on the amount of pressurized gas required to operate the percussor. The vent passageway also relieves gas pressure from a remote pneumatic applicator between successive bursts of gas from the percussor assembly. An improved remote applicator having means for selecting the force of the percussive bursts is also provided.

2 Claims, 5 Drawing Figures

PERCUSSOR SUBASSEMBLY FOR GENERATING GAS BURSTS

REFERENCE TO OTHER APPLICATIONS

This application is a divisional of application Ser. No. 602,146, now U.S. Pat. No. 4,566,441 filed Apr. 19, 1984, which is a continuation-in-part of application Ser. No. 223,355, filed Jan. 8, 1981 now U.S. Pat. No. 4,445,503 which is a continuation-in-part of application Ser. No. 50,685, filed June 21, 1979, abandoned.

BACKGROUND OF THE INVENTION

In my more recent prior application there is disclosed a percussor assembly utilizing a diaphragm sealing means between a gas pressure chamber communicating with a gas outlet passageway, whereby gas pressure from a pressurized gas source builds up in the chamber until it overcomes a gas seal created by the biased diaphragm against a valve seat. When the gas seal is broken, a burst or pressure wave of gas passes from the gas pressure chamber through the outlet passageway to a remote percussor head or applicator pneumatically connected to the gas outlet passageway. A disadvantage of the prior percussor assembly is that all of the gas directed to the applicator originates from the gas pressure source so that over prolonged periods of use, the volume of gas required to operate the unit may be significant. Where the pressurized gas source is oxygen operating costs may be substantial.

SUMMARY OF THE INVENTION

The improved percussor assembly of the present invention incorporates a vent means communicating with a gas outlet passageway system taking advantage of the venturi principle to entrain atmospheric air as a portion of the gas required to operate the remote applicator. Such an improvement reduces the amount of pressurized gas required thus reducing operating costs. An improved remote applicator is also provided.

DETAILED DESCRIPTION OF THE INVENTION

Figure 1:
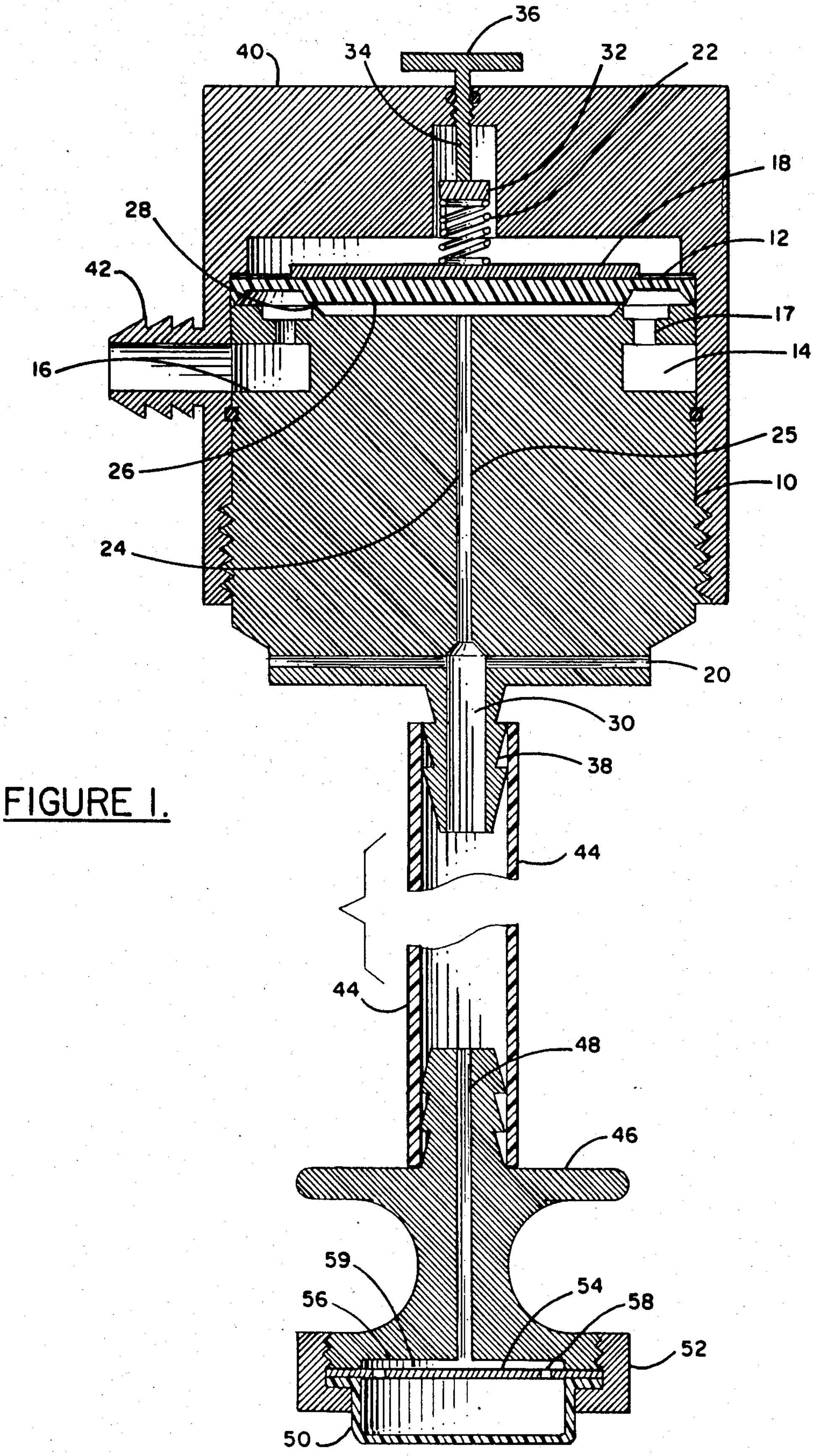
FIG. 1 is a side-sectional view of the percussor assembly of the invention including the remote applicator.

The improved percussor assembly shown in FIG. 1 includes a rigid body member 10 having a gas inlet passageway 16 and a gas outlet passageway 25. These passageways are separated by a gas sealing valve means including a valve seat 28 and a flexible diaphragm 12 which is biased against the valve seat to normally form a gas-tight seal. The gas inlet passageway system includes a gas pressure chamber 14 in which gas pressure builds up from a pressurized gas source which is connected to inlet pipe 42 via a gas supply tube, not shown. The gas inlet passageway also includes a connecting passageway 17 whereby pressurized gas introduced into the percussor is forced against the exposed surface of the diaphragm. The specific location of the gas inlet passageways and the gas pressure chamber, which forms a portion of the inlet passageway system is not critical so long as there are no restrictions which would affect the adequate flow of gas to valve seat 28.

In a preferred embodiment as shown, diaphragm 12 is urged against valve seat 28 by spring 22 forcing diaphragm pressure plate 18 downwardly. Pressure adjustment against plate 18 is provided by rotating knob 36 secured to shaft 34 which threadedly engages cap 40. Spring tension plate 32 is moved up or down by rotating the knob thereby increasing or decreasing the tension on spring 22 as desired. By so varying the tension on the diaphragm, the force of the successive bursts of gas or pressure waves are varied, the greater tension against the plate and diaphragm resulting in a greater percussive force.

The gas outlet passageway 25 includes a restricted passageway portion 24 and enlarged passageway portion 30. An important improvement of the invention includes a vent 20 which communicates to the outside of the percussor body and the enlarged gas outlet passageway 30. The vent enters the enlarged outlet passageway portion at or close to the junction with the restricted passageway portion 24 to maximize its advantage and purpose. As a burst of relatively high pressure gas from restricted passageway portion 24 enters the enlarged portion 30, a partial vacuum is created causing atmospheric air to be entrained or drawn into vent 20. This additional entrained air thus reduces the overall amount of gas required to operate the percussor applicator as will be more fully explained hereinafter.

The applicator shown includes an applicator body 46 which is preferably shaped as shown so that it may be easily held between the fingers in the hand of the user or therapist. The applicator includes a passageway 48 and a diaphragm retaining ring 52 which threadedly engages the applicator body for securing flexible diaphragm 50. In a preferred embodiment, gas is supplied to chamber 54 away from the axis of passageway 48 to prevent accidental occlusion of the passageway by a fully compressed diaphragm. For this purpose, in the embodiment shown, a plate 59 is secured between the diaphragm and the applicator body, the plate having one or more ports 58 which are off center, preferably adjacent the peripheral edge of the plate, near the side of the diaphragm. The plate is also spaced from gas passageway 48 leaving a cavity 56 sufficient for the flow of gas from the passageway. The applicator is pneumatically connected to the percussor assembly by flexible tubing 44 which is also secured to outlet pipe 38 of the percussor body 10.

In operating the device, pressurized gas from a suitable source is introduced into percussor body 10 through gas inlet pipe 42. For example, gas from an oxygen cylinder is normally delivered at about 50 psi through a regulator at a suitable flow rate. The gas inlet passageway system including inlet passageway 16, gas pressure chamber 14 and passageway 17 are sealed from gas outlet passageway 24 at valve seat 28 by biased diaphragm 12. When the gas pressure in the inlet passageway system is sufficient to overcome the gas-tight seal at the valve seat, the diaphragm is lifted temporarily allowing a burst of gas (in the form of a pressure wave) passing from gas outlet chamber 26 successively through restricted portion 25 and enlarged portion 30 of the gas outlet passageway. When the burst of gas reaches enlarged outlet passageway 30, a reduced pressure or partial vacuum is created at that area of the passageway thereby causing atmospheric air to be entrained via vent 20. The combined gas from chamber 26 and entrained air is then directed via outlet pipe 38 through tubing 44 into the applicator.

The apparatus will generate a rapid succession of gas bursts as diaphragm 12 is intermittently separated from the valve seat 28. Between gas bursts, the diaphragm returns to form a gas-tight seal with the valve seat until gas pressure is again sufficient to unseat the downwardly biased diaphragm. The successive bursts of gas supplied to the applicator create rather sharp gas wave forms against the diaphragm resulting in a percussive effect as the diaphragm is urged against a patient's body. A therapist or user will place the applicator so that diaphragm 50 rests against a patient's body. As the applicator is held against the patient, these percussive wave forms will pass through the diaphragm to the patient to achieve the desired theraputic result.

Between bursts of gas, pressure in the system is relieved through vent 20 whereby atmospheric or nearly atmospheric pressure is intermittently achieved following each percussive burst at the applicator. Thus, the vent provides a dual function of entraining atmospheric air into the apparatus, thereby reducing the amount of gas required to effectively operate the device, and venting gas to atmosphere for relieving pressure between bursts.

Figure 2:
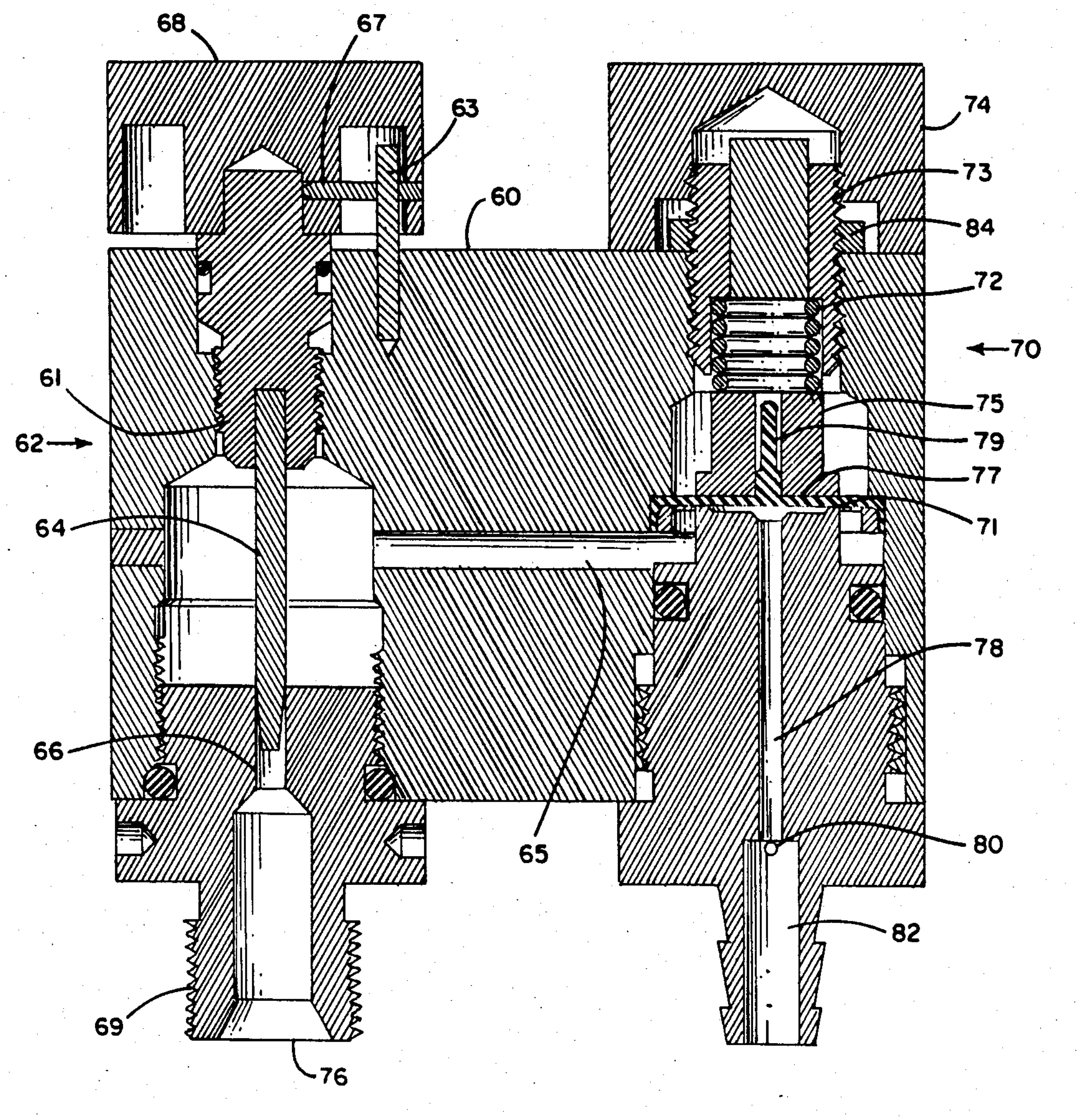
FIG. 2 is a side-sectional view of another embodiment of a percussor of the invention.

In FIG. 2 there is illustrated another embodiment of a percussor of the invention. In the drawing shown, body 60 includes a gas inlet portion 62 and outlet portion 70. Components of the gas inlet portion include a gas inlet passageway 66 having at the inlet end 76 means for being secured to gas tubing which is connected to a gas supply source such as a compressed gas cylinder, compressor, or the like. Tubing from such a gas source normally terminates with a threaded fitting so that end 76 of the gas inlet passageway may include a threaded inlet connector inlet post 69 for being secured to the gas supply tube fitting. A needle valve 64 is located in the gas inlet passageway 66 and is adjustable for selecting the flow of gas into the percussor body. For such selection, needle valve 64 includes a threaded collar 61 secured to a rotatable knob 68. By rotating the knob, the needle valve is inserted or withdrawn in the gas inlet passageway to control the gas flow into the apparatus which allows one to select the frequency of the bursts of gas generated by the percussor. A pin 63 cooperating with a stop plate 67 provides a means for stopping rotation of the knob between lowest and highest practical selected flows. Such a stop is optional, but provides a safety means to avoid inadvertently rotating the knob too far in either direction.

A gas outlet portion 70 is located adjacent gas inlet portion 62 and a conduit 65 directs gas from the inlet portion to the outlet portion. Components of the gas outlet portion include diaphragm 77 which rests on valve seat 71 to form a gas-tight seal between conduit 65 and the gas outlet passageway. The latter includes a restricted outlet passageway 78 which communicates with the diaphragm, and an enlarged outlet passageway 82. A vent 80 is located at the junction of the restricted and enlarged outlet passageways and functions as previously described. A diaphragm plunger 75 rests against the upper surface of diaphragm 77 thereby urging the diaphragm against valve seat 71 to maintain a temporary gas-tight seal between the inlet and outlet passageways. Preferably, the diaphragm plunger has an axial cavity in which an upright diaphragm post 79 may be forceably inserted whereby the diaphragm and diaphragm plunger are held together to prevent independent movement which would cause excessive play, wear and less efficient operation of those components. A spring 72 rests on a shoulder formed around diaphragm plunger 75. A threaded sleeve 73 is secured into body 60 and is urged against the spring to maintain the desired spring tension. A locking nut 84 is then tightened to keep sleeve 73 in place. A cap 74 is then secured to the upper end of the threaded sleeve. If some adjustment of the force against the diaphragm is desired, threaded sleeve 76 may be adjusted which will affect the pressure or force of the successive bursts of gas created. The greater the force of the spring urged against the diaphragm, the greater the gas force necessary to unseat the diaphragm resulting in gas bursts of increased pressure. However, it is found that varying the diaphragm pressure will also cause a frequency change. Thus, once suitable diaphragm pressure is established, it may be preferable to avoid normal user adjustment. For this purpose, in the embodiment shown, a non-adjusting cap 74 covers threaded sleeve 73 and locking nut 84.

The function of the embodiment of FIG. 2 is substantially the same as that described with the apparatus shown in FIG. 1 except that the gas inlet and gas outlet portions are separated, each having a convenient means for selecting different performance characteristics of the apparatus. The force or gas wave form of bursts of gas generated by the apparatus may also be selected by using a heavier or lighter diaphragm plunger. For example, it has been found that where the plunger is formed from a lighter plastic material, the wave form of the bursts of gas are not as sharp as compared to using a plunger of a heavier material, such as brass. On the other hand, where a sharper wave form is produced by using a heavier plunger, the noise generated by the apparatus may also increase. However, by selecting the type of spring as well as the plunger material, one may tailor the characteristics of the gas wave form, within limits, depending on whether the apparatus is to be used for more delicate patients such as babies or small children, where sharp wave forms may be less desirable, and older children and adults where sharper wave forms may be necessary to achieve the desired percussive results. The apparatus shown in this embodiment may be used with a remote percussor head as previously described.

Figure 3:
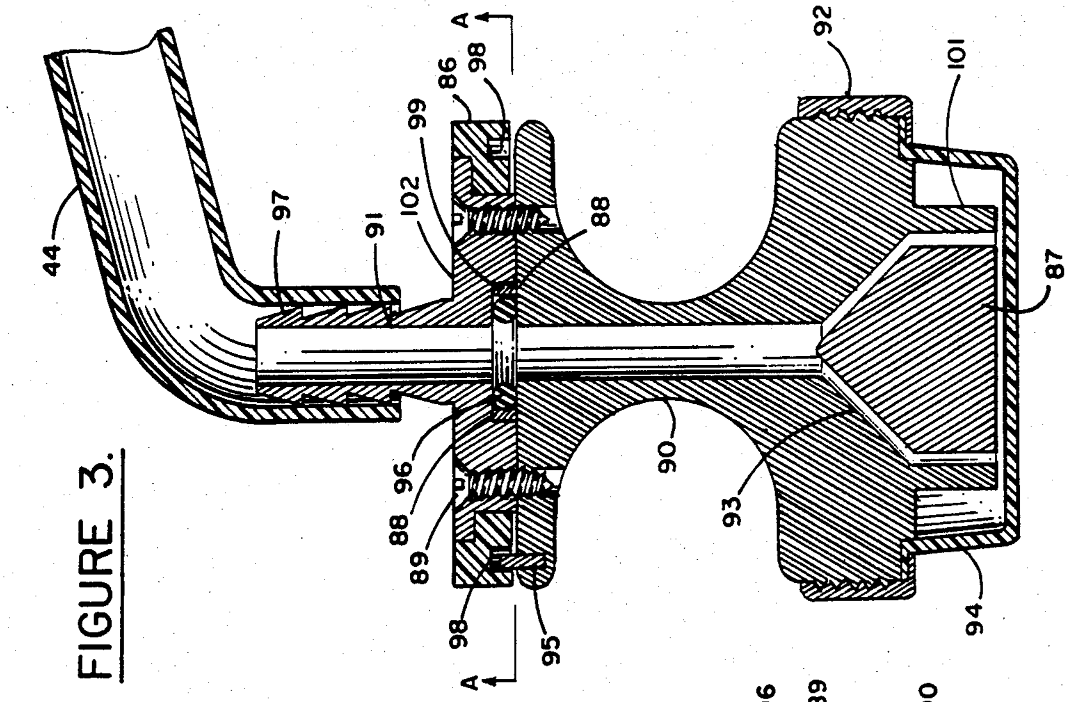
FIG. 3 is a side-sectional view of an improved applicator.
Figure 5:
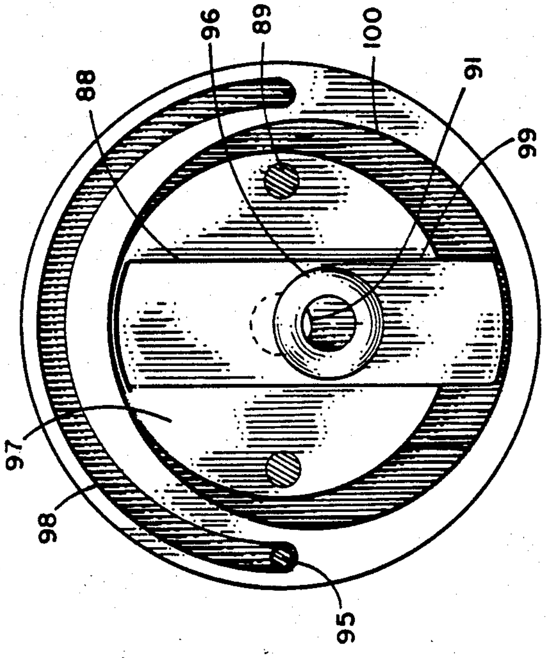
FIGS. 4 and 5 are views taken along line A—A of FIG. 3, showing different positions of a variable flow restrictor.
Figure 4:
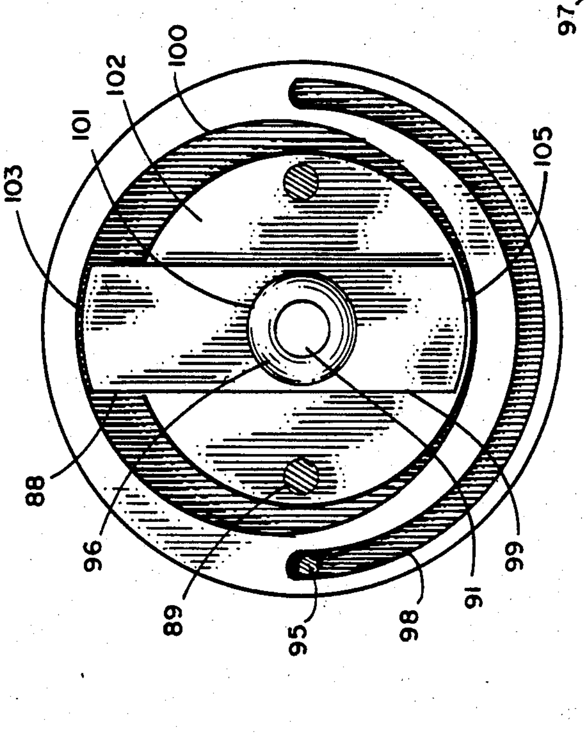

A further improved embodiment of the percussor apparatus of the invention is shown in FIGS. 3–5 for a remote hand-held applicator. The improved applicator includes a body member 90 having a gas passageway 91 extending therethrough. A hose barb 97 is used for securing supply tubing 44, the other end of the tubing being secured to the percussor body member as previously described. At the opposite end of the remote body is flexible diaphragm 94, secured by a retainer ring 92 threadedly engaging the body member. Conveniently the diaphragm and retainer ring have flanges which cooperate for this purpose, similar to the remote applicator illustrated in FIG. 1. A plug 87 or similar supporting member is used to cooperate with the flexible diaphragm and limit the extent to which it can be compressed when held against a patient's body. For this purpose, the design of the body member includes an annular skirt 101 around plug 87 and having branch gas passageways 93 therearound which direct the gas from the percussion generator to the diaphragm. The plug may be molded as an integral part of the applicator body or it may be formed separately and secured in the applicator assembly.

An important feature of the applicator of this embodiment of the invention is its feature of selecting the force of the percussive bursts applied to the diaphragm. This feature is provided by a movable restrictor which cooperates with the gas passageway whereby the latter may be varied between an open and closed condition. Observing also FIGS. 4 and 5, the assembly includes a slider 88 having an orifice 101 therein, the slider being moved so as to selectively orient or index the slider orifice relative to gas passageway 91. A rotatable cam body 86 is held by a cap member 102 secured to the applicator body 90 by screws 89. The cap member 102 includes a slider channel 99 in which slider 88 is received and along which it moves. The interior cam surface 100 formed on cam body 86 is offset axially from the axis of cam body rotation. Although cam surface 100 is circular, it is eccentric relative to both the axis of rotation of the cam body and the center of gas passageway 91. The slider includes first and second end surfaces 103 and 105, respectively, surface 103 being further away from the center of orifice 101 than second end surface 105. Thus, as cam body 86 is rotated, the first and second end surfaces of slider 88 contact circular, eccentric cam surface 100 thereby causing slider 88 to move reciprocally along slider channel 99. As the slider moves, the location of orifice 101 changes relative to stationary gas passageway 91. The two extreme positions of the slider are shown in FIGS. 4 and 5, FIG. 4 illustrating the slider position when it is oriented such that gas passageway 91 is fully open. In FIG. 5, with the cam body having been rotated 180° from the position shown in FIG. 4, the gas passageway 91 is substantially closed. An O-ring 96 is secured in slider orifice 101, the O-ring conveniently having an internal diameter the same as the diameter of gas passageway 91. The O-ring simply prevents leakage of the gas around the slider orifice. In utilizing such a feature, by rotating cam body 86, the force of the bursts of gas from the percussor generator may be increased or deceased, thereby allowing a therapist or user to select the amount of force desired at the applicator diaphragm. Also shown is a guide pin 95 secured to remote body 90 and extending into 180° guide slot 98 whereby the rotation of cam body 86 is limited at 180° between the two positions shown in FIGS. 4 and 5. Different cam surface shapes and corresponding contact slider surfaces may be used to accomplish the same purposes. For example, the cam surface may be cardioid which may be advantageous for eliminating backlash of the plate through the range of movement.

Other modifications or adaptations of the apparatus shown in the drawings without departing from the invention disclosed will be understood by those skilled in the art.

I claim:

1. A percussor assembly comprising, in combination, an apparatus for generating successive bursts of gas, and a remote applicator pneumatically connected to said apparatus with a flexible gas supply tubing and for receiving said bursts of gas therefrom, said applicator comprising:

a body attached to said tubing, adapted for being hand-held and having a gas passageway therein for directing said bursts of gas received from said apparatus, a flexible diaphragm secured to said body and a percussion chamber therebetween for receiving said bursts of gas, and a movable restrictor cooperating with said gas passageway for selectively varying the opening thereof said restrictor comprising a slidable plate having an orifice therethrough for being oriented relative to said gas passageway and movable relative to said gas passageway between a first position wherein said passageway is substantially open and a second position wherein said passageway is substantially closed, and a movable guide having a cam surface in contact with said slidable plate whereby movement of said guide urges movement of said slidable plate along said cam surface, and whereby the force of said bursts of gas may be selected by moving said restrictor.

2. The assembly of claim 1 wherein said guide comprises a rotatable wheel secured to said body.

* * * * *